US011912133B2

(12) United States Patent
Tanizawa et al.

(10) Patent No.: US 11,912,133 B2
(45) Date of Patent: Feb. 27, 2024

(54) VEHICLE DRIVE UNIT

(71) Applicant: MITSUBISHI JIDOSHA KOGYO KABUSHIKI KAISHA, Tokyo (JP)

(72) Inventors: Shoji Tanizawa, Tokyo (JP); Shinsuke Horibe, Tokyo (JP); Masaharu Yamagishi, Okazaki (JP); Chika Takaba, Tokyo (JP); Toshihiko Ando, Tokyo (JP); Kohei Higashitani, Tokyo (JP); Kenji Umemura, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 56 days.

(21) Appl. No.: 17/761,937

(22) PCT Filed: Nov. 9, 2020

(86) PCT No.: PCT/JP2020/041651
§ 371 (c)(1),
(2) Date: Mar. 18, 2022

(87) PCT Pub. No.: WO2021/111809
PCT Pub. Date: Jun. 10, 2021

(65) Prior Publication Data
US 2022/0371529 A1 Nov. 24, 2022

(30) Foreign Application Priority Data

Dec. 6, 2019 (JP) .................................. 2019-220920
Mar. 3, 2020 (JP) .................................. 2020-035969
Mar. 3, 2020 (JP) .................................. 2020-035970

(51) Int. Cl.
*B60K 6/46* (2007.10)
*B60L 50/61* (2019.01)
(Continued)

(52) U.S. Cl.
CPC .................. *B60K 6/46* (2013.01); *B60K 6/26* (2013.01); *B60K 6/28* (2013.01); *B60K 6/40* (2013.01);
(Continued)

(58) Field of Classification Search
CPC ... B60K 1/00; B60K 1/04; B60K 5/04; B60K 6/26; B60K 6/28; B60K 6/40; B60K 6/46;
(Continued)

(56) References Cited

U.S. PATENT DOCUMENTS 9,260,007 B2 * 2/2016 Sakaguchi ............. B60K 11/04
2007/0119637 A1 * 5/2007 Yajima .................. B60K 6/445
180/65.1

(Continued)

FOREIGN PATENT DOCUMENTS

JP   2001-119961 A    4/2001
JP   2013-82339 A     5/2013
(Continued)

OTHER PUBLICATIONS

English translation of International Preliminary Report on Patentability and Written Opinion of the International Searching Authority for International Application No. PCT/JP2020/041651, dated May 17, 2022.
(Continued)

*Primary Examiner* — Hal Kaplan
(74) *Attorney, Agent, or Firm* — Birch, Stewart, Kolasch & Birch, LLP

(57) ABSTRACT

A vehicle drive unit includes an internal combustion engine (21), an electromotive unit (23) having a first electric motor (31) and a second electric motor (33), an inverter (27) disposed above the electromotive unit, a first harness (41) that electrically connects the inverter and a first terminal
(Continued)

block (61) of the first electric motor, and a second harness (42) that electrically connects the inverter and a second terminal block (62) of the second electric motor. The first electric motor and the second electric motor are disposed in a vehicle front-rear direction. Of the first electric motor and the second electric motor, one electric motor is disposed on the front side in the front-rear direction, and the other electric motor is disposed on the rear side in the front-rear direction. The other electric motor is offset upward in the up-down direction with respect to the one electric motor. The electromotive unit has a predetermined space (A) formed: in a region above the one electric motor and in rear of the front end of the one electric motor; and in a region in front of the other motor and below the upper end of the other electric motor. The first terminal block and the second terminal block are located in the predetermined space.

9 Claims, 11 Drawing Sheets

(51) Int. Cl.
| | | |
|---|---|---|
| *B60L 1/00* | (2006.01) | |
| *B60L 9/18* | (2006.01) | |
| *B60K 6/26* | (2007.10) | |
| *B60K 6/28* | (2007.10) | |
| *B60K 6/40* | (2007.10) | |
| *B60K 11/04* | (2006.01) | |
| *B60R 16/02* | (2006.01) | |
| *B60R 16/03* | (2006.01) | |

(52) U.S. Cl.
CPC .............. *B60K 11/04* (2013.01); *B60L 1/003* (2013.01); *B60L 9/18* (2013.01); *B60L 50/61* (2019.02); *B60R 16/0207* (2013.01); *B60R 16/03* (2013.01); *B60L 2210/40* (2013.01)

(58) Field of Classification Search
CPC .......... B60K 6/54; B60K 13/02; B60K 11/04; B60L 1/00; B60L 1/003; B60L 9/18; B60L 50/61; B60L 2210/40; B60R 16/0207; B60R 16/03
USPC .................................................. 307/9.1, 10.1
See application file for complete search history.

(56) References Cited

U.S. PATENT DOCUMENTS

| | | |
|---|---|---|
| 2009/0014222 A1 | 1/2009 | Tatematsu et al. |
| 2013/0307328 A1* | 11/2013 | Maemoto ............ H01M 50/204 |
| | | 307/10.1 |

FOREIGN PATENT DOCUMENTS

| | | |
|---|---|---|
| JP | 2014-97727 A | 5/2014 |
| WO | WO2007/091705 A1 | 8/2007 |

OTHER PUBLICATIONS

International Search Report for International Application No. PCT/JP2020/041651, dated Jan. 19, 2021.
Written Opinion of the International Searching Authority for International Application No. PCT/JP2020/041651, dated Jan. 19, 2021.

* cited by examiner

VEHICLE DRIVE UNIT

TECHNICAL FIELD

The present invention relates to a vehicle drive unit, and particularly relates to a technique for improving the protection performance of a harness.

BACKGROUND ART

These days vehicles called hybrid vehicles that can utilize engines for power generation and can utilize driving force of motors to travel are becoming widespread.

In the engine compartment of such a hybrid vehicle, there are disposed a plurality of devices such as a motor, an engine, a generator that converts driving force generated by operating the engine into electric energy, and an inverter that converts between alternating current and direct current.

Thus, the layout inside the engine compartment of a hybrid vehicle is much more complicated than the layout inside the engine compartment of a vehicle that uses a conventional engine as a drive source. Therefore, there are problems such as how to arrange the respective devices and what kind of parts are used.

In order to solve such a layout problem, there may be a configuration of connecting a high voltage cable to terminal blocks provided on surfaces, of the motor, in the vehicle left-right direction (Patent Document 1).

PRIOR ART DOCUMENT

Patent Document

Patent Document 1: Japanese Patent Laid-Open No. 2014-97727

SUMMARY OF THE INVENTION

Problems to be Solved by the Invention

However, in the technique disclosed in above Patent Document 1, for example, when the motor moves to rear of the vehicle due to a front collision of the vehicle, the respective devices disposed in a complicated manner in the engine compartment come into contact with the terminal block of the motor. This may damage the terminal block. Therefore, there is room for further improvement.

The present invention has been made in view of such a problem, and an object of the present invention is to provide a vehicle drive unit capable of preventing damage to terminal blocks (a first terminal block and a second terminal block) of a motor and an inverter at a time of a vehicle collision.

Means for Solving the Problems

In order to achieve the above object, a vehicle drive unit of the present invention includes: an internal combustion engine disposed in an engine compartment of a vehicle; an electromotive unit disposed on one side of the internal combustion engine in a vehicle left-right direction, the electromotive unit having a first electric motor that generates electricity by driving the internal combustion engine and a second electric motor that is driven by electric power supplied from a driving battery of the vehicle; an inverter disposed above the electromotive unit; a first harness that electrically connects the inverter and a first terminal block of the first electric motor; and a second harness that electrically connects the inverter and a second terminal block of the second electric motor, wherein the first electric motor and the second electric motor are disposed in a vehicle front-rear direction, and, with respect to one electric motor, another electric motor is offset upward in the up-down direction, the one electric motor being disposed on the front side in the front-rear direction out of the first electric motor and the second electric motor, the other electric motor being disposed on the rear side in the front-rear direction out of the first electric motor and the second electric motor, the electromotive unit has a predetermined space formed in a region above the one electric motor and in rear of a front end of the one electric motor and a region in front of the other electric motor and below an upper end of the other electric motor, and the first terminal block and the second terminal block are located in the predetermined space.

Advantageous Effects of the Invention

According to the vehicle drive unit of the present invention, the second electric motor is located on the rear side in the vehicle front-rear direction and the upper side in the up-down direction of the first motor, so that: a predetermined space is formed; and the first terminal block and the second terminal block are located in the space. This positional relationship allows the first terminal block and the second terminal block to be provided inside the outer edge of the electromotive unit as viewed from the vehicle left-right direction. This can prevent the first terminal block and the second terminal block of the motor and the inverter from being damaged at a time of a vehicle collision.

MODE FOR CARRYING OUT THE INVENTION

The following describes an embodiment of the present invention with reference to drawings.

Figure 1:
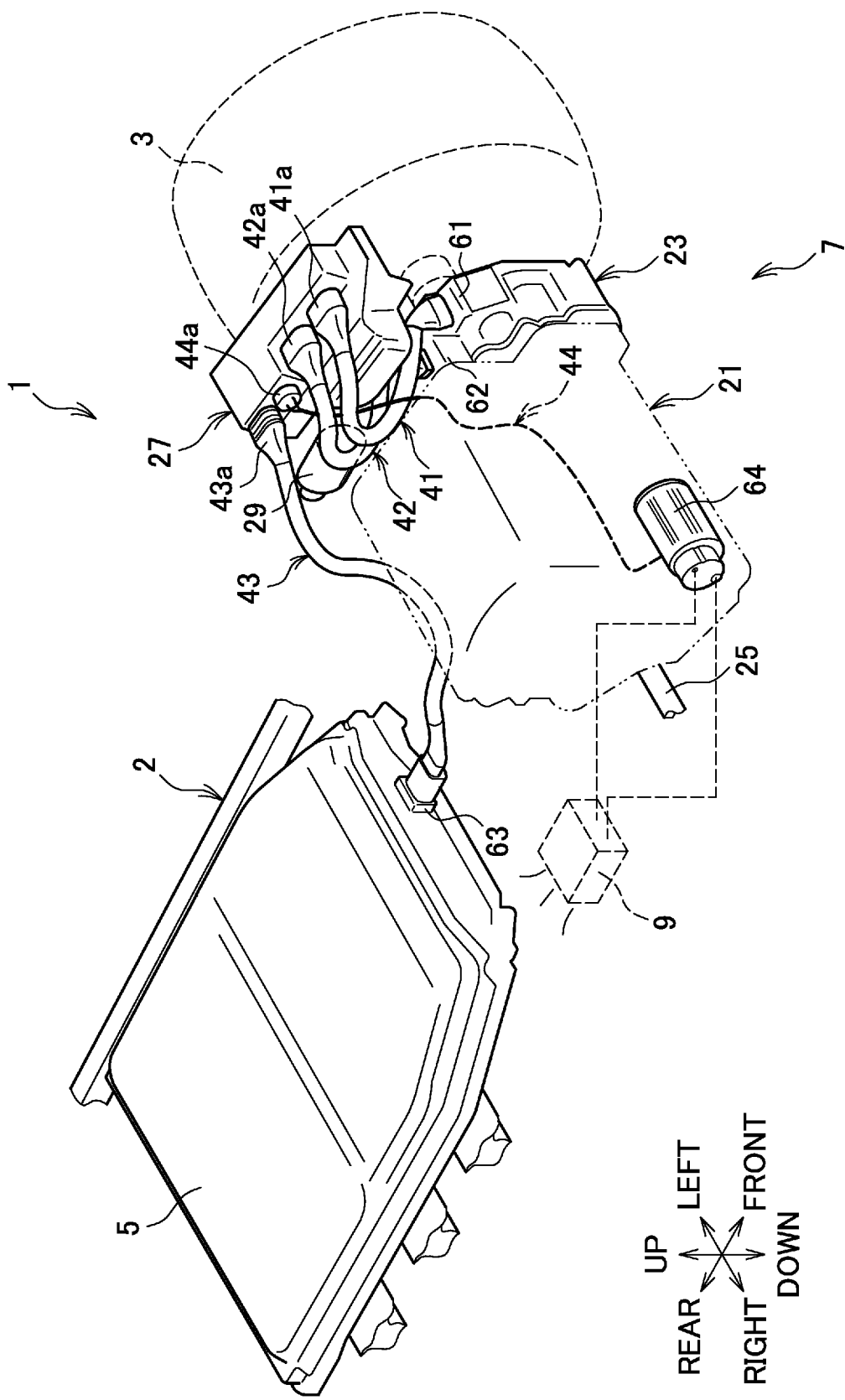
FIG. 1 is a schematic perspective view of a vehicle.

With reference to FIG. 1, a schematic perspective view of the vehicle 1 is shown.

The vehicle 1 is a so-called hybrid vehicle including drive wheels 3, a battery pack (driving battery) 5, and a drive unit 7. This vehicle includes the drive unit 7 that can generate driving force to drive the drive wheels 3 for traveling. The drive unit 7 is supplied with electric power from the battery pack 5 disposed on the lower center side in the vehicle front-rear direction of the vehicle body 2.

Further, the vehicle 1 can perform so-called regenerative braking in which the vehicle 1 decelerates and generates electric power by the drive unit 7 to supply electric power to the battery pack 5 to store electric power. Further, the drive unit 7 is provided with an engine 21 to be described below. The vehicle 1 can operate the engine 21 to generate electric power, and to supply electric power to the battery pack 5 to store electric power.

The following describes the respective devices and the like in detail. Note that, for convenience of description: the front and rear in the vehicle front-rear direction are simply called the front and the rear; the left and right in the vehicle left-right, direction are simply called the left and right; and the up and down in the vehicle up-down direction are simply called the up and down.

Figure 2:
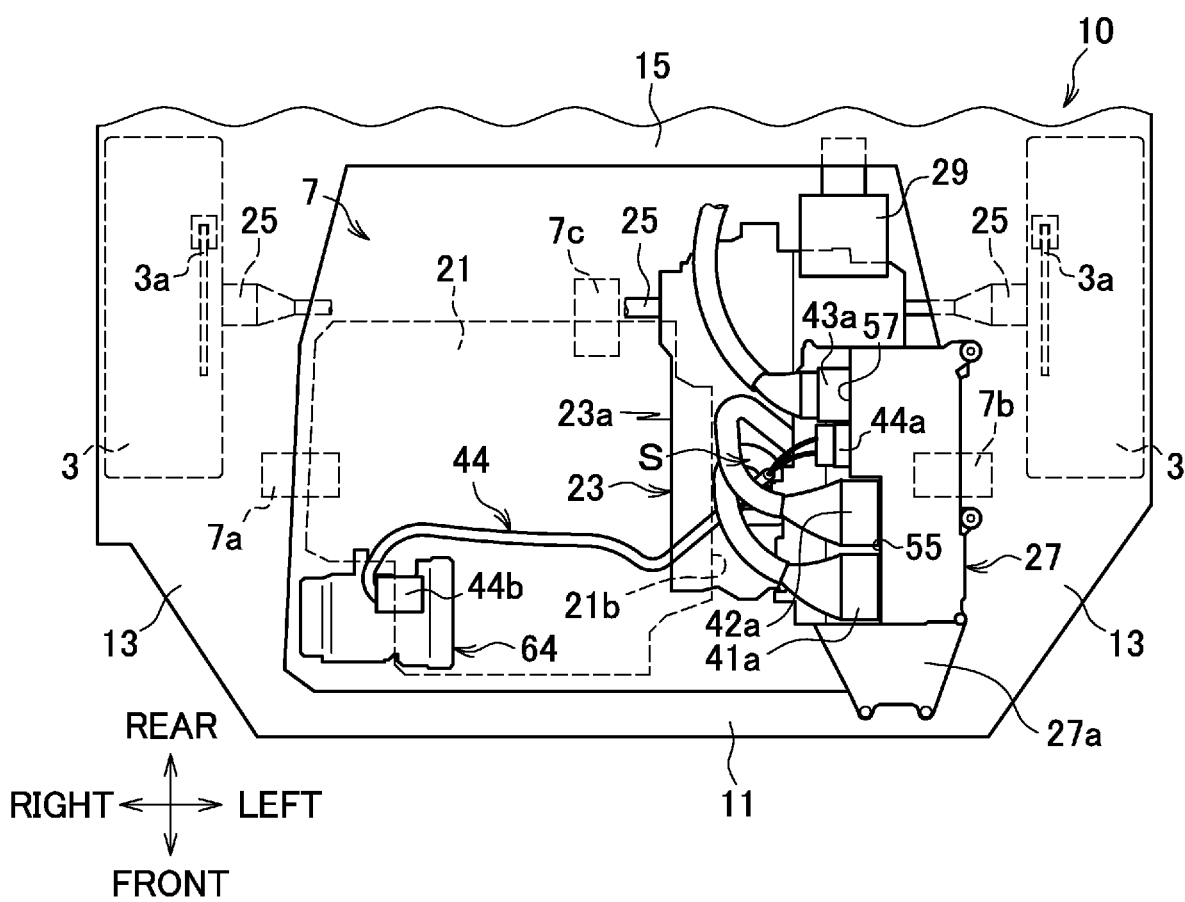
FIG. 2 is a top view of an engine compartment.
Figure 3:
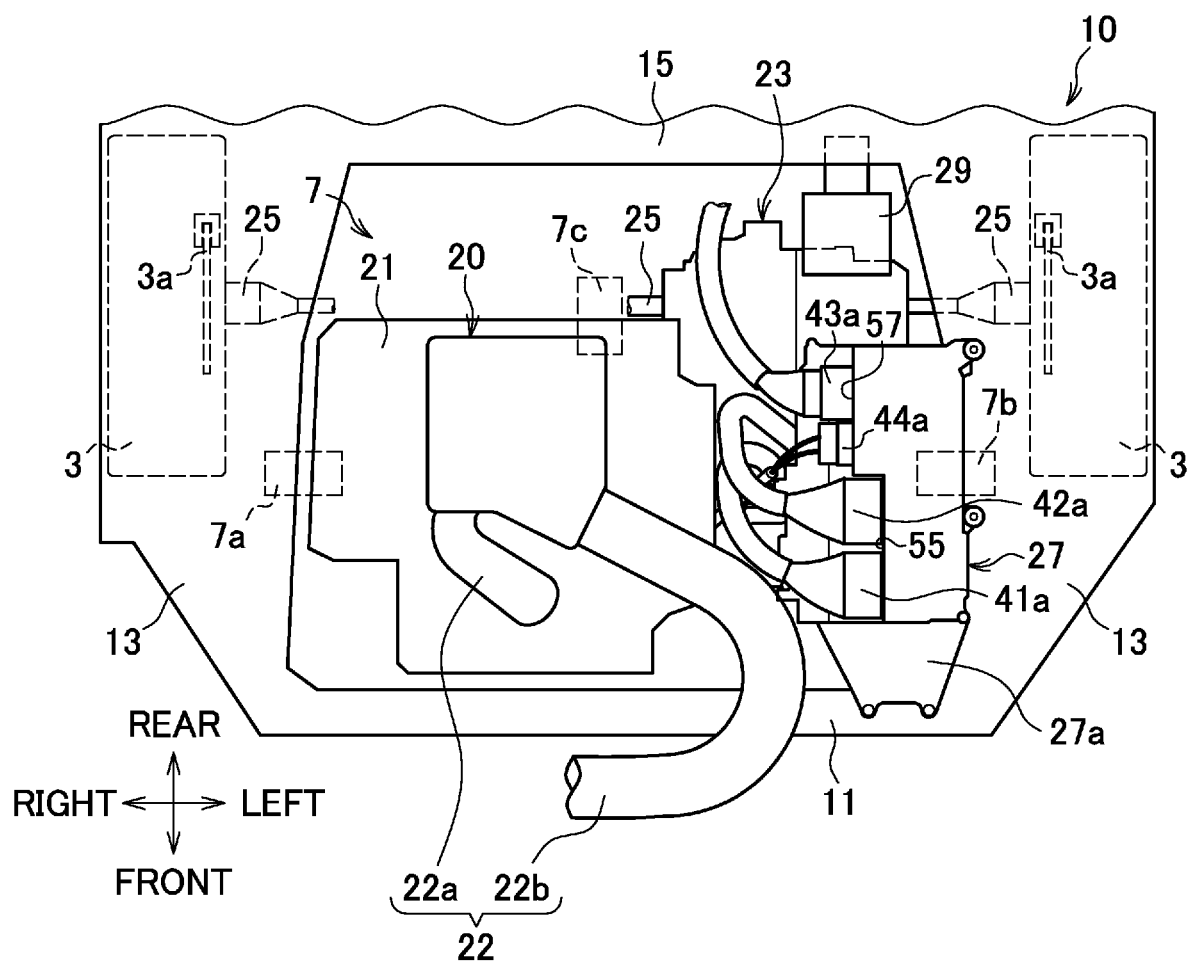
FIG. 3 is a top view Gf the engine compartment.
Figure 4:
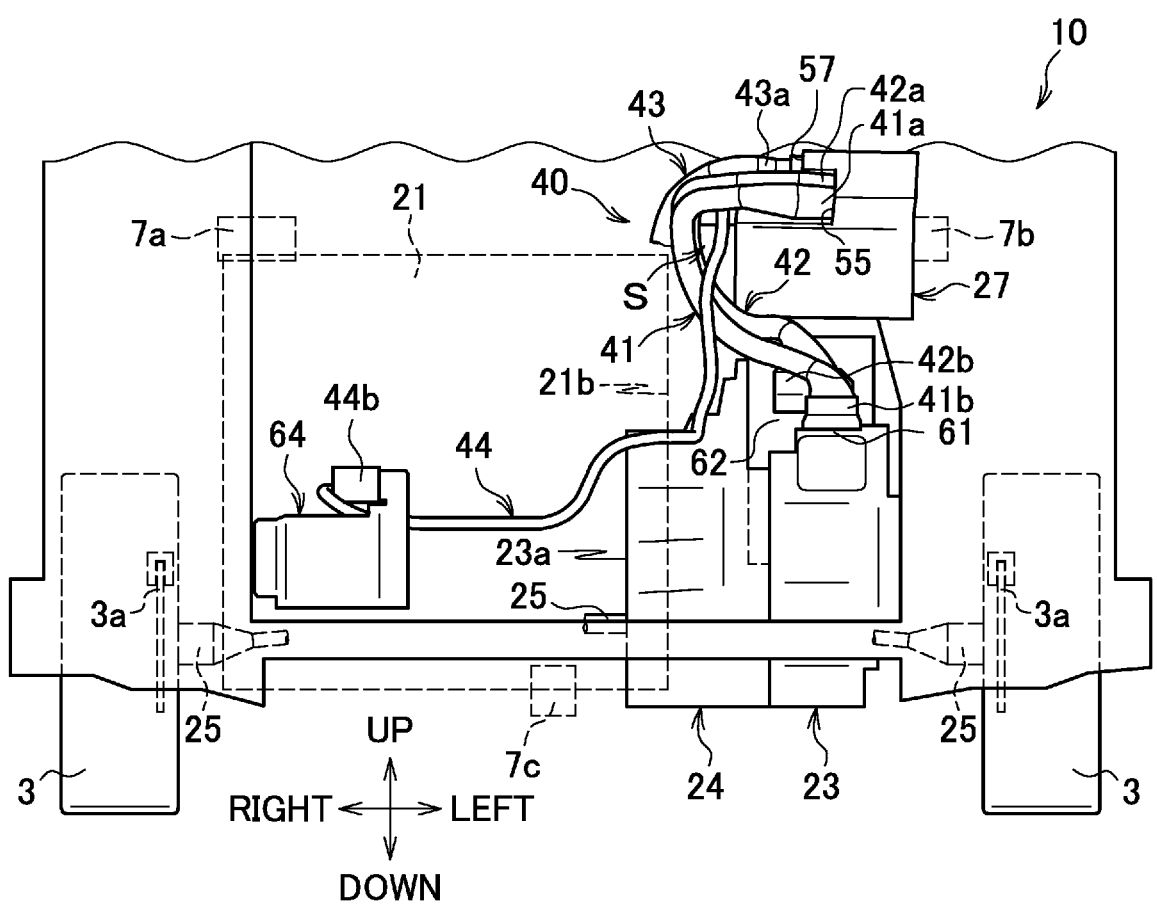
FIG. 4 is a front view of the engine compartment.

With reference to FIGS. 2 and 3, a top view of the engine compartment 10 is shown, and with reference to FIG. 4, a front view of the engine compartment 10 is shown.

The engine compartment 10 is a space formed so as to be covered with a skeletal member on the front side of the vehicle body 2 such as an upper bar 11, an upper side 13, and a floor panel 15. The engine compartment 10 has a drive unit 7 disposed.

The drive unit 7 includes an engine (internal combustion engine) 21, a transaxle (electromotive unit) 23, a speed reducer (transmission) 24, a drive shaft 25, an inverter 27, and an electric booster (braking force adding device) 29. The engine 21 and the transaxle 23 in the drive units 7 are swingably attached to the vehicle body 2 via, for example, a first mount 7a, a second mount 7b, and a third mount 7c. The first mount 7a is provided on the upper end right side of the engine 21, the second mount 7b on the upper end left side of the transaxle 23, and the third mount 7c on the lower end rear side of the engine 21. The engine 21 is an internal combustion engine that combusts fuel stored in a fuel tank (not shown) to operate. Operating the engine 21 can drive the output shaft 21a (see FIG. 5 to be described below). The transaxle 23 is an electromotive unit fixed to a joint surface (joint portion) 23a on the left side of the engine 21, and has a generator (first electric motor) 31 and a motor (second electric motor) 33.

An air cleaner 20 is arranged above the engine 21 (see FIG. 3). The air cleaner 20 is a device for removing dust and dirt in the air sucked into the engine 21, and is interposed in the middle of the intake passage 22 of the engine 21. Hereinafter, the intake passage 22 on the downstream side of the air cleaner 20 (outlet side of the intake passage 22 and the engine side) is referred to as a downstream intake passage 22a. Then, the intake passage 22 on the upstream side (inlet side of the intake passage 22) of the air cleaner 20 is referred to as an upstream intake passage 22b.

The downstream intake passage 22a extends downward from the front surface of the air cleaner 20. On the other hand, the upstream intake passage 22b extends from the left side of the vehicle left-right direction in the front surface of the air cleaner 20, diagonally forward to the left side of the downstream intake passage 22a. Then, the upstream intake passage 22b is formed in a shape that bends to the right side of the vehicle after passing above the transaxle 23.

Figure 5:
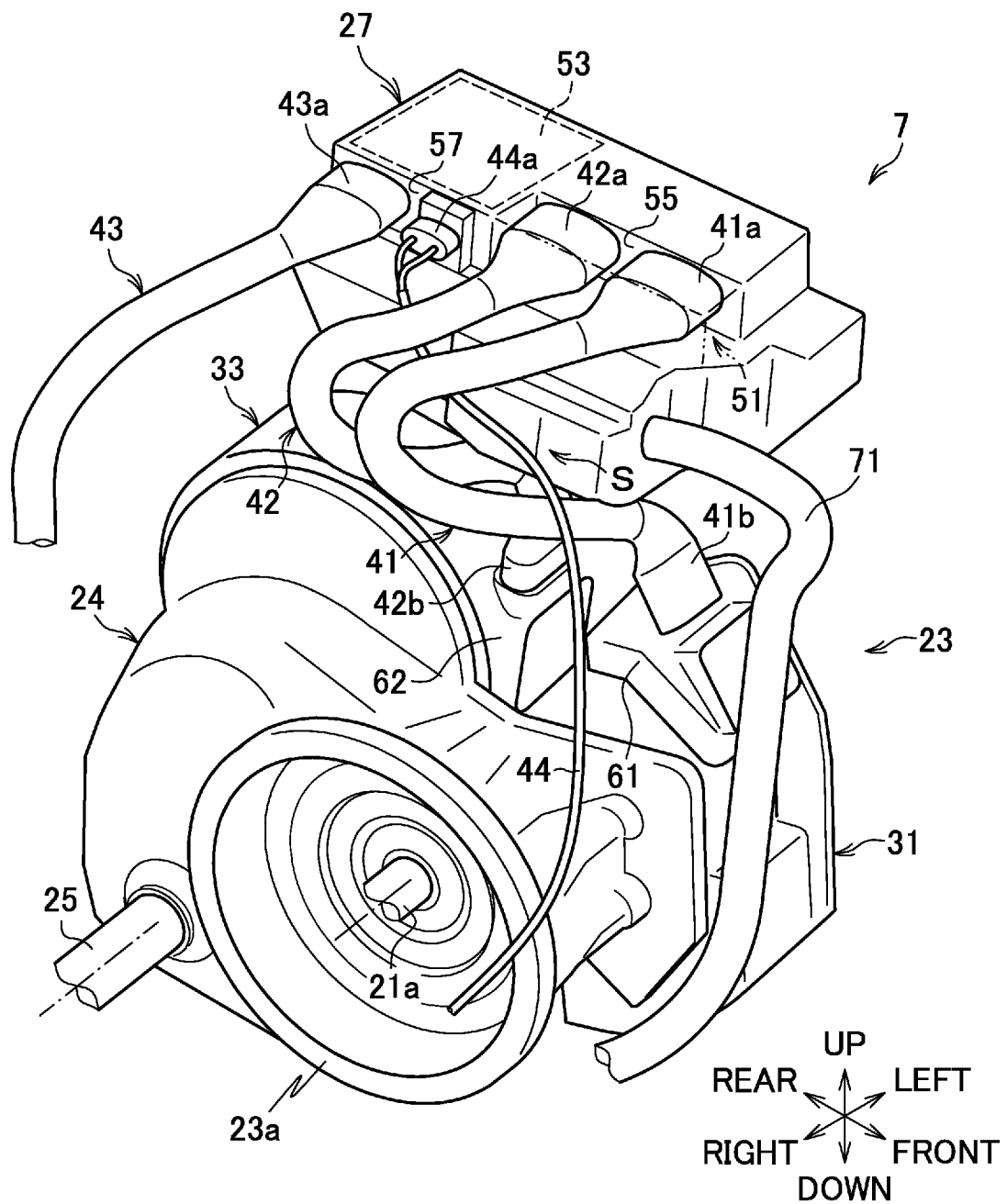
FIG. 5 is a perspective view of a transaxle, a speed reducer, and an inverter as viewed from a front upper right.
Figure 6:
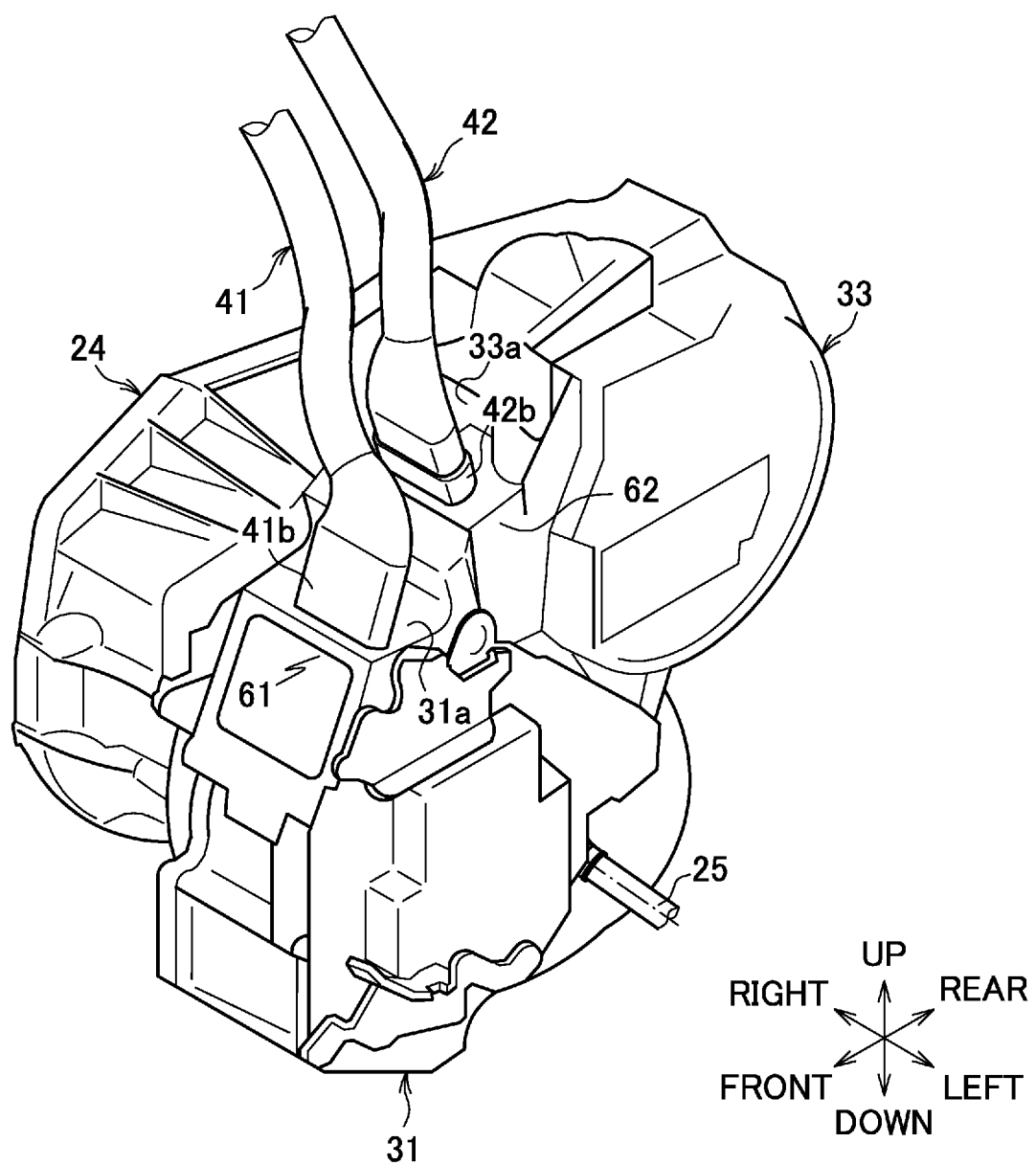
FIG. 6 is a perspective view of the transaxle and the speed reducer as viewed from a front upper left.

With reference to FIG. 5, there is shown a perspective view of the transaxle 23, the speed reducer 24, and the inverter 27 as viewed from the front upper right. Further, with reference to FIG. 6, a perspective view of the transaxle 23 and the speed reducer 24 as viewed from the front upper left is shown. The generator 31 is a generator that converts the driving force of the output shaft 21a, which is driven by the operation of the engine 21, into electric energy. The motor 33 is an electric motor driven by electric power supplied from the battery pack 5 via the inverter 27. Further, the motor 33 can utilize the rotation of the drive wheels 3 due to the traveling of the vehicle 1 to generate electricity while decelerating the drive wheels 3. The motor 33 is located on the rear side and the upper side of the generator 31.

The speed reducer 24 is a gear unit located between: the engine 21; and the generator 31 and the motor 33. The speed reducer 24 can reduce the rotational speed of the motor 33 and increase the torque to transmit the driving force to the drive shaft 25. The drive shaft 25 is a shaft member having one end connected to the speed reducer 24 and the other end connected to the drive wheel 3 so as to be able to transmit a driving force.

The inverter 27 is a conversion device capable of converting a direct current into a three-phase alternating current, changing a three-phase alternating current into a direct current, and changing a voltage. The inverter 27 is also called a power drive unit (PDU) and incorporates an inverter circuit and an electronic control device. The inverter circuit includes switch element such as an IGBT (Insulated Gate Bipolar Transistor) or a MOSFET (Metal-Oxide-Semiconductor Field-Effect Transistor). Further, the electronic control device has a function of controlling the operating state (on/off timing and drive frequency) of the switch element.

Further, the inverter 27, for example, has the front end fixed to the upper bar 11, and the left end fixed to the upper side 13 (see FIG. 2). Further, the inverter 27 is disposed in a posture tilting by an angle $\theta$ (for example, 10 degrees) so that the front side tilts downward (see FIG. 7 to be described below).

Specifically, the front end part of the inverter 27 is provided with a flat plate-shaped front end support portion 27a (shown in FIG. 2 and FIG. 3). The front end support portion 27a is fixed to the upper bar 11 in a state in which the lower surface side of the front end support portion 27a is in surface contact with the top surface of the upper bar 11. Further, the rear end part of the inverter 27 is provided with a bracket 27b (see FIG. 7 to be described below).

The bracket 27b is formed in a shape that connects the inverter 27 and a frame member such as a side member (not shown) in the vertical direction. The lower end surface of the bracket 27b is fixed to the top surface of the side member, and the upper end surface of the bracket 27b is fixed to the bottom surface of the inverter 27.

The inverter 27 is electrically connected to the generator 31 via a first harness 41, the motor 33 via a second harness 42, and the battery pack 5 via a third harness 43. The below describes in detail of: connection configurations of the inverter 27, generator 31, motor 33, first harness 41, second harness 42, and third harness 43; and shapes of the first harness 41, second harness 42, and third harness 43. Further, the first harness 41, second harness 42, and third harness 43 are also collectively referred to as a harness group 40.

As a result, the drive unit 7 converts the electric power stored in the battery pack 5 into a three-phase alternating current by the inverter 27 and supplies it to the motor 33. The electric power drives the motor 33 to drive the drive wheels 3 via the speed reducer 24 and the drive shaft 25, so that the vehicle 1 can travel. Further, the drive unit 7 can generate electricity by the transaxle 23 when decelerating the drive wheels 3, and can generate electricity by the generator 31 by operating the engine 21. Then, the drive unit 7 can convert the electric power generated by the generator 31 and the motor 33 into a direct current by the inverter 27 and store the electric power in the battery pack 5.

Here, the battery pack 5 is, for example, a lithium ion battery or a nickel hydrogen battery, which is a secondary battery capable of supplying a high voltage direct current of several hundred volts. The battery pack 5 is arranged on the lower surface (under the floor) of the vehicle 1, in the rear part of the vehicle, in the vehicle interior, in the luggage compartment, and the like. The battery pack 5 is electrically connected to the motor and the generator 31 via the inverter 27.

Further, the battery pack 5 can supply electric power to the motor 33. The battery pack 5 can be charged by the regenerative power of the motor 33 or the generated electric power of the generator 31, and can also be charged by receiving power supplied from the outside of the vehicle (external charging).

The electric booster 29 is an electric assist device that assists the force required when the driver of the vehicle 1 presses the brake pedal to operate the braking device 3a provided on each wheel (drive wheel 3). The center C of the electric booster 29 is located at the rear of the transaxle 23 and the inverter 27 and below the rear lower end P of the inverter 27.

According to FIG. 5, the inverter 27 is provided with a step portion 51, a DC circuit 53, an AC terminal block 55, and a DC terminal block 57. Further, the inverter 27 connects to a refrigerant pipe 71 through which EV cooling water (electric vehicle cooling water) as a refrigerant for cooling the inverter circuit flows.

The step portion 51 is a step recessed from the front side with respect to the substantially center in the front-rear direction in the upper right side of the inverter 27, to the left.

The DC circuit 53 is a circuit internally installed on the rear side of the step portion 51 in an upper part of the inverter 27.

The AC terminal block 55 is a terminal block disposed on the left side surface of the step portion 51 on the upper right side of the inverter 27. The AC terminal block 55 is connected to one end 41a of the first harness 41 and one end 42a of the second harness 42 so that they extend to the right from the AC terminal block 55.

The DC terminal block 57 is a terminal block disposed on the right of the DC circuit 53 on the upper right side of the inverter 27. The DC terminal block 57 is connected to one end 43a of the third harness 43 and one end 44a of the fourth harness 44 so that they extend to the right from the DC terminal block 57.

Figure 7:
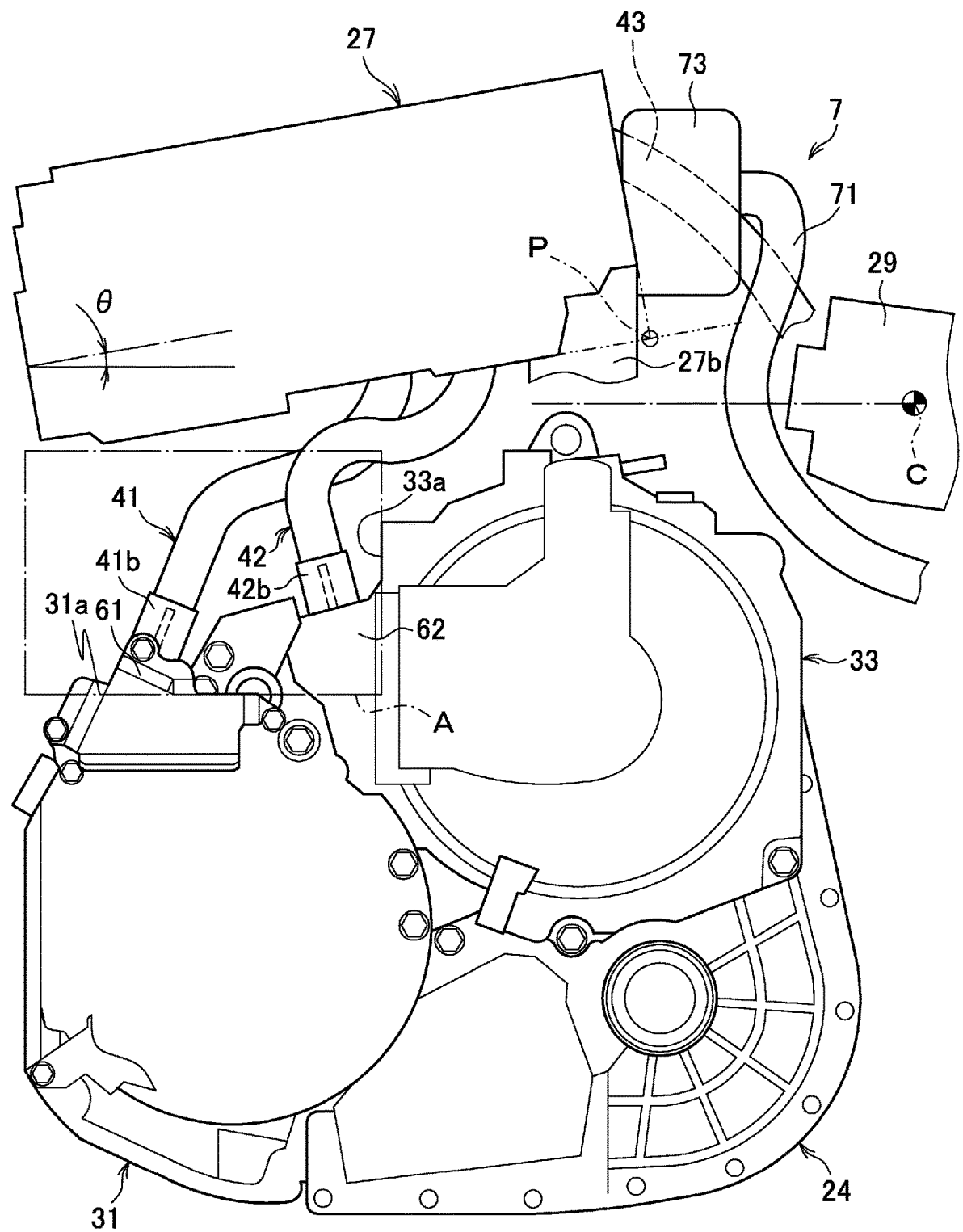
FIG. 7 is a left side view of the transaxle, the speed reducer, and the inverter.
Figure 8:
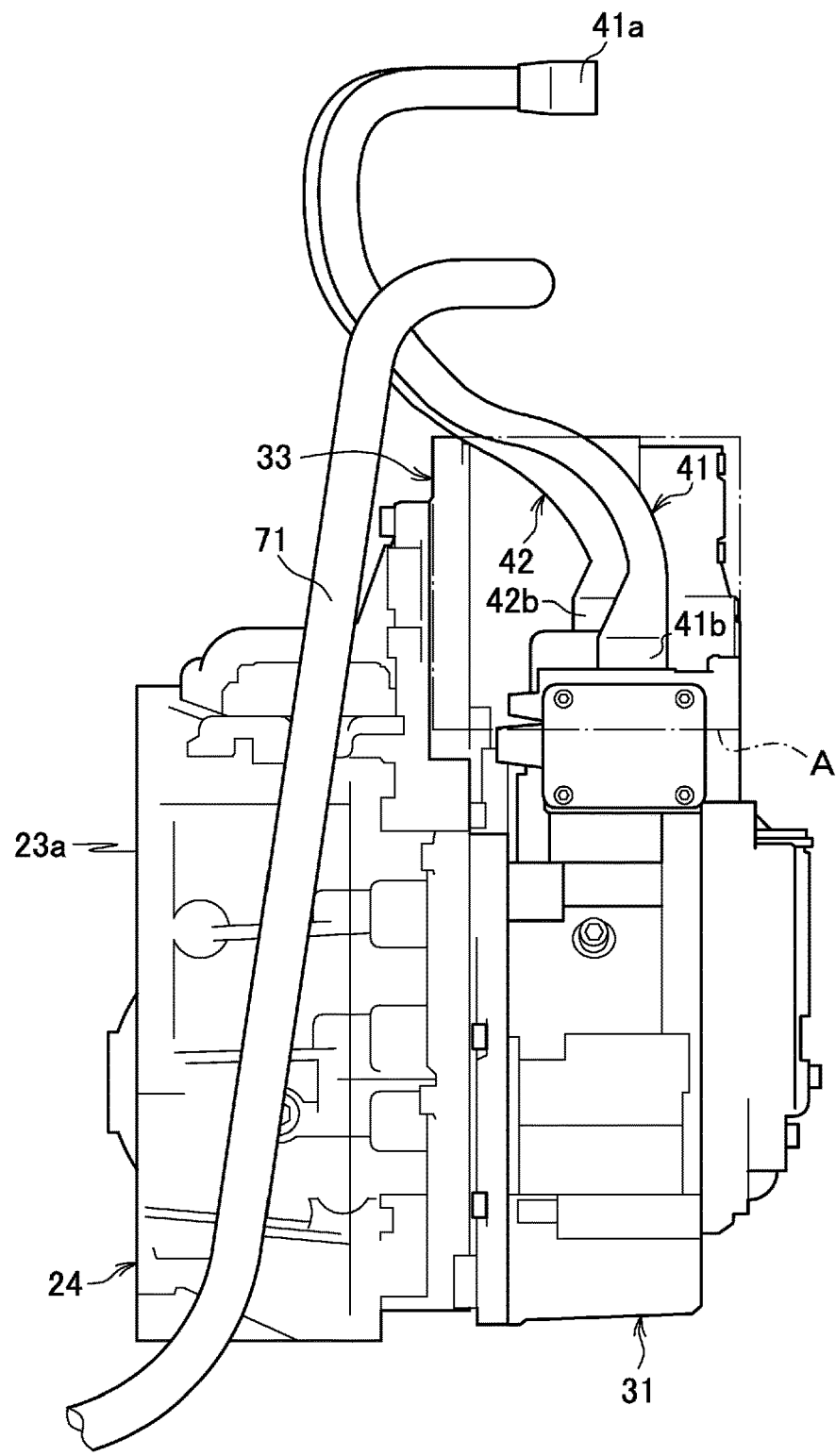
FIG. 8 is a front view of the transaxle and the speed reducer.

With reference to FIG. 7, a left side view of the transaxle 23, the speed reducer 24, and the inverter 27 is shown. Further, with reference to FIG. 8, a front view of the transaxle 23 and the speed reducer 24 is shown. The upper end 31a of the generator 31 is provided with a first terminal block 61, and the front end 33a of the motor 33 is provided with a second terminal block 62. The first terminal block 61 is a terminal block to which the other end 41b of the first harness 41 is electrically connected, so that electric current can flow between the generator 31 and the inverter 27 via the first harness 41. The second terminal block 62 is a terminal block to which the other end 42b of the second harness 42 is electrically connected, so that electric current can flow between the motor 33 and the inverter 27 via the second harness 42.

As described above, the motor 33 is located on the rear side and the upper side of the generator 31, that is, the motor 33 is disposed so as to be offset upward in the up-down direction. Due to this positional relationship between the generator 31 and the motor 33, the upper end 31a of the generator 31 and the front end 33a of the motor 33 form a predetermined space A in the transaxle 23. In other words, the first terminal block 61 and the second terminal block 62 are located in a predetermined space A.

According to FIG. 1, at the front end of the battery pack 5, there is disposed a third terminal block 63 to which the other end 43b of the third harness 43 is electrically connected. Further, at a front right end of the engine 21, there is disposed an electric air compressor 64 used for an air conditioner 9 for adjusting the temperature of air in the vehicle interior of the vehicle 1. The electric air compressor 64 is electrically connected to the other end 44b (shown in FIG. 2 and FIG. 4) of the fourth harness 44. Here, the electric air compressor 64 consumes less electric power than the generator 31 and the motor 33. Therefore, the fourth harness 44 is a thinner wiring than the first harness 41, the second harness 42, and the third harness 43.

According to FIG. 4, the first harness 41 extends in the right direction from the AC terminal block 55 of the inverter 27. The first harness 41 further extends downward and to the left from the right side with respect to the left end 21b of the engine 21. The left end 21b is on the left side of the joint surface 23a of the engine 21. Then, the first harness 41 connects to the first terminal block 61 of the generator 31. Further, according to FIG. 5, the first harness 41 extends so that the center in the up-down direction bends backward. The second harness 42 extends in the same manner as the first harness 41, that is, extends along the rear of the first harness 41 and connects to the second terminal block 62 of the motor 33.

According to FIG. 1, the third harness 43 extends to the right from the DC terminal block 57 of the inverter 27, extends downward along the rear of the engine 21, and then extends rearward to connect to the third terminal block 63 of the battery pack 5. Further, the third harness 43 is routed along the surface of the floor panel 15 on the vehicle front side. In this way, the third harness 43 connected to the battery pack 5 is routed in the vehicle rear side of the first harness 41 and the second harness 42. This prevents deformation and damage of the third harness 43 at a time of front collision of the vehicle 1.

The fourth harness 44 extends from the front of one end 43a of the third harness 43 in the DC terminal block 57 of the inverter 27, to the right. The fourth harness 44 further extends through a passage (space) S (FIGS. 2 to 5) formed by the first harness 41 and the second harness 42, and the inverter 27. Then, the fourth harness 44 extends along the front side of the engine 21, and connects to the electric air compressor 64. Each harness may be formed so as to maintain the above posture, or may use a clip or the like to maintain the above posture.

Here, the upstream intake passage 22b is arranged on the vehicle front side with respect to the harness group 40. The upstream intake passage 22b is arranged so as to protrude from the right side of the harness group 40 to the front of the harness group 40 when viewed from above. Therefore, the upstream intake passage 22b functions to protect the harness group 40 against an external force from the front of the vehicle.

As a result, the front of the harness group 40 is protected by the upstream intake passage 22b. This makes the external force at a time of the vehicle front collision unlikely to act directly on the harness group 40. This can prevent deformation or melting of the harness group 40 due to an external force, and improve the protection performance of the harness group 40 against an external force.

According to FIGS. 5 and 7, the refrigerant pipe 71 connects to the front end part and the rear end part of the inverter 27 so that EV cooling water can flow. The EV cooling water flows in from the front end side of the inverter 27 and flows out from the rear end side thereof. As a result, the refrigerant pipe 71 can create a simple layout while preventing interference with the harness group 40. Further, this can shorten the refrigerant pipe 71 to reduce the pressure loss generated in the circulation of the EV cooling water. Therefore, this can improve the cooling efficiency of the inverter 27. Further, this can make the pipe shorter than the pipe in a structure in which the refrigerant pipe 71 is connected only to the front end part of the inverter 27, for example. This allows efficiently routing the pipe.

The vehicle rear side of the inverter 27 has a condenser tank 73 (container) for storing EV cooling water arranged thereon. The condenser tank 73 is a device for separating air bubbles in water from EV cooling water. The circulation path of the EV cooling water that cools the inverter 27 is provided separately from the circulation path of the engine cooling water that cools the engine 21.

As described above, a container-shaped part that can be deformed by external force is arranged in rear of the inverter 27. This allows the condenser tank 73 to act like a cushion, preventing the inverter 27 from being damaged due to contact with the floor panel 15. Therefore, this can improve the protection performance of the inverter 27. Further, absence of the harness group 40 routed in rear of the inverter 27 allows effectively utilizing the open space in the engine compartment, and reducing the size and weight of the vehicle 1.

The EV cooling water flowing into the inverter 27 is stored in a cooling water tank (not shown) and introduced into the inverter 27 via a pump or an EV radiator (not shown). Further, the EV cooling water that has passed through the inverter 27 cools other components (for example, a rear motor, an in-vehicle charging device, etc.) and then returns to the cooling water tank.

Figure 9:
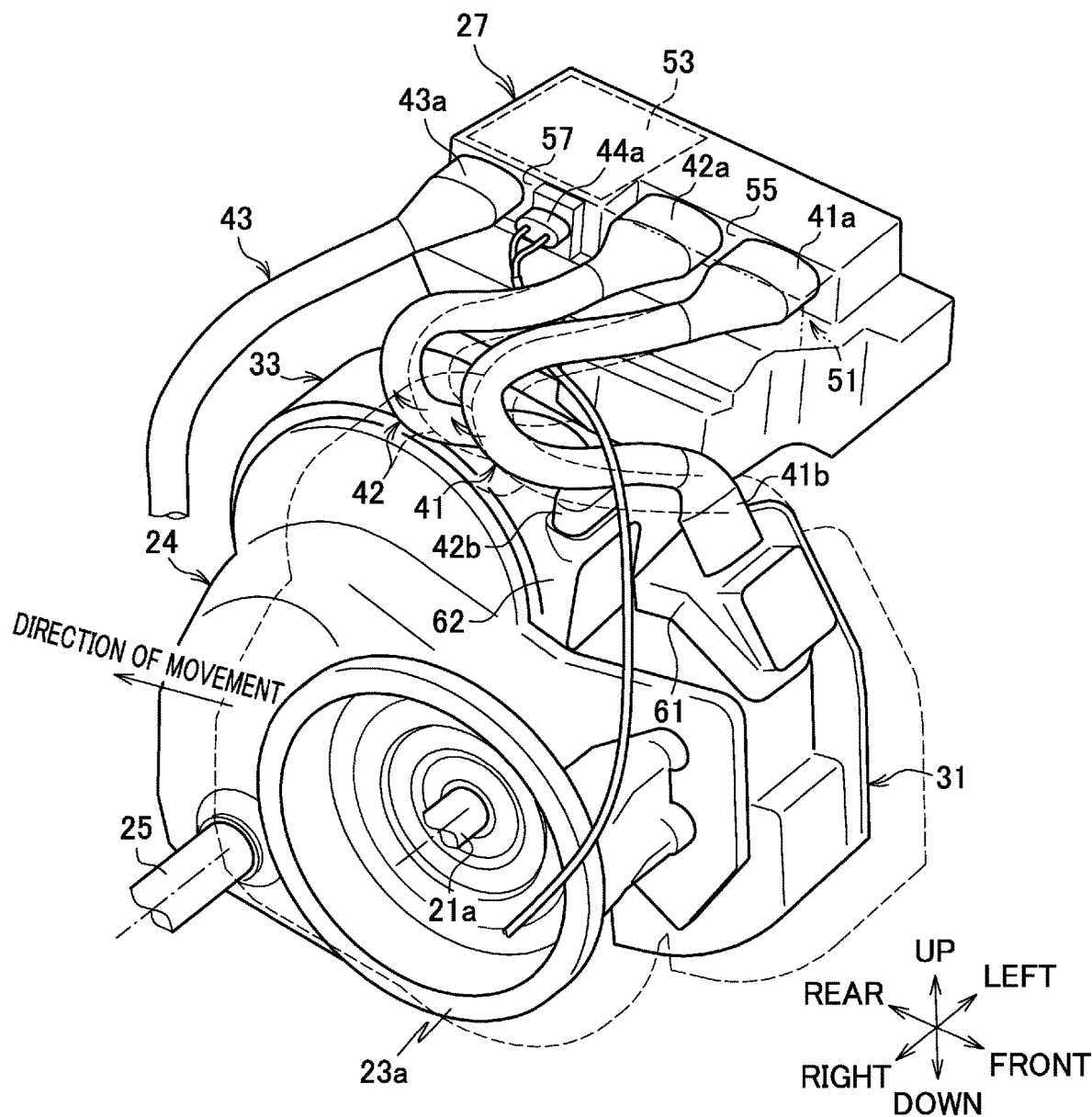
FIG. 9 is a perspective view of the transaxle, the speed reducer, and the inverter as viewed from a front upper right when the transaxle and the speed reducer move backward.

With reference to FIG. 9, there is shown a perspective view of the transaxle 23, the speed reducer 24, and the inverter 27 as seen from the front upper right when the transaxle 23 and the speed reducer 24 move rearward. Further, with reference to FIGS. 10 and 11, there are shown explanatory diagrams illustrating the arrangement of the respective devices before and after the vehicle 1 collides with an obstacle 100 in the front. The following describes the operation and effect of the drive unit 7 according to the present invention with reference to FIGS. 9 to 11.

As described above, for example, the front end of the inverter 27 is fixed to the upper bar 11 and the left end thereof is fixed to the upper side 13. On the other hand, the engine 21 and the transaxle 23 are swingably mounted on the vehicle body 2 via the first mount 7a, the second mount 7b, and the third mount 7c. Therefore, the inverter 27 does not move together with the transaxle 23 when the transaxle 23 swings, and may move relatively differently from the transaxle 23.

Figure 10:
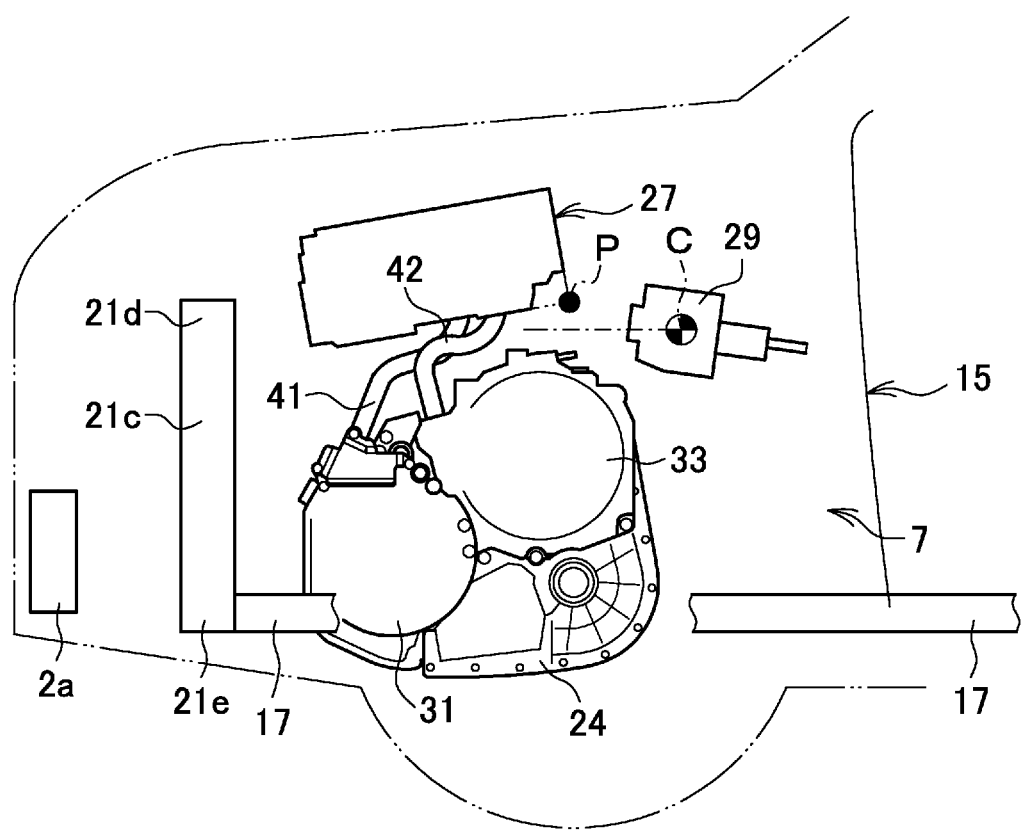
FIG. 10 is an explanatory diagram illustrating an arrangement of each device before the vehicle collides with an obstacle in the front.
Figure 11:
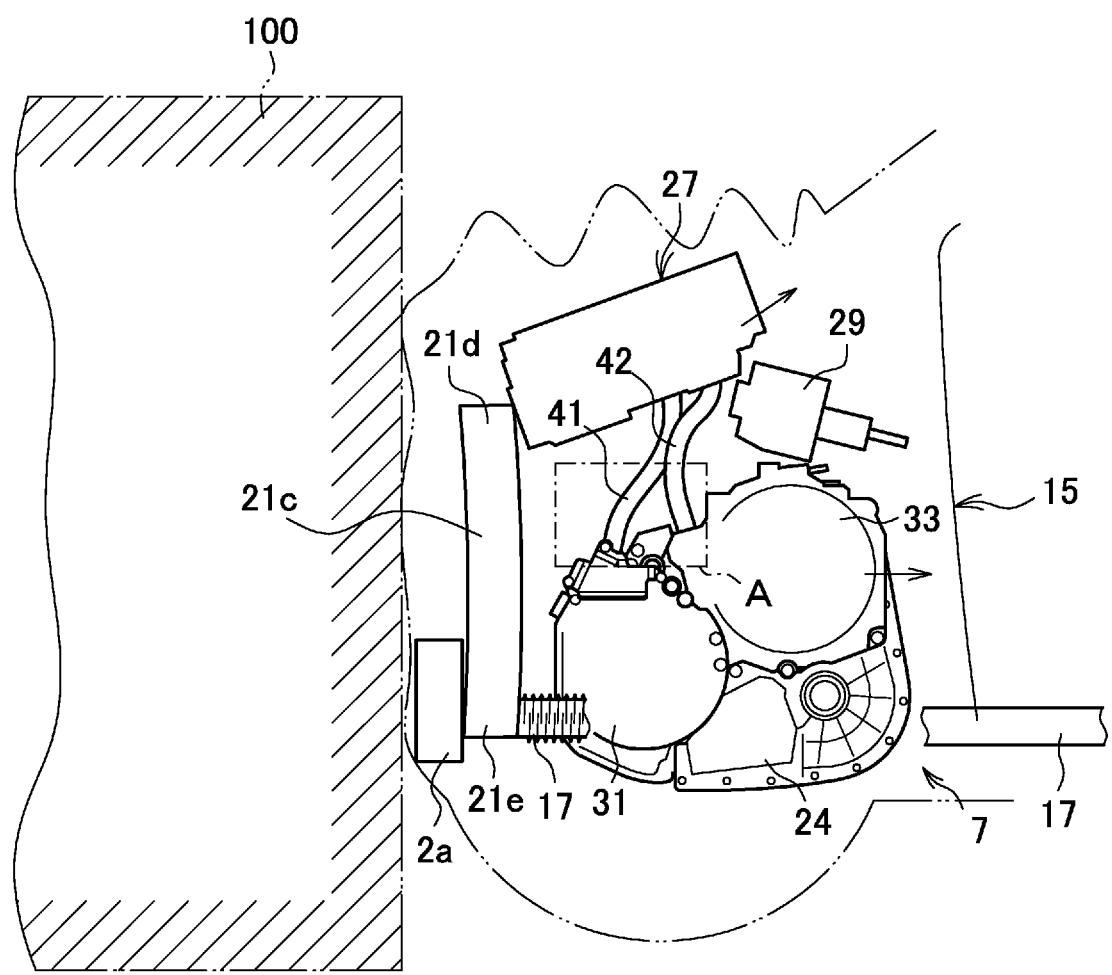
FIG. 11 is an explanatory diagram illustrating the arrangement of each device after the vehicle collides with an obstacle in the front.

Here, according to FIG. 10, a reinforcement 2a and a radiator 21c are disposed in front of the drive unit 7. The upper end 21d of the radiator 21c is located in front of the inverter 27. Further, the lower end 21e of the radiator 21c is fixed to the suspension cross member 17, which is a skeletal member of the vehicle 1. As a result, when the vehicle 1 collides with the obstacle 100 in the front as shown in FIG. 11, the engine 21 and the transaxle 23 may move rearward relatively to the inverter 27 due to the reinforcement 2a and the radiator 21c located in front of the drive unit 7.

Here, the first harness 41 and the second harness 42 extend to the right from one ends 41a and 42a. Therefore, when the engine 21 and the transaxle 23 move rearward relatively to the inverter 27 as described above, the other ends 41b and 42b move so as to turn backward about one ends 41a and 42a. This can prevent the first harness 41 and the second harness 42 from being pulled. Further, a step portion 51 is formed in the inverter 27, and an AC terminal block 55 is disposed in the step portion 51. This allows preventing the first harness 41 and the second harness 42 from interfering with the engine 21 if the first harness 41 and the second harness 42 are formed so as to extend to the right from one ends 41a and 42a.

Further, the calorific value of the transaxle 23 is smaller than that of the engine 21 that operates while combusting fuel, so that the space above the transaxle 23 is colder than the space above the engine 21. Based on this, the harness group 40 is routed not in the space above the engine 21 but in the space above the transaxle 23 arranged adjacent to the engine 21. This can prevent deformation and melting of the harness group 40 due to heat generated by the engine 21, and improve the protection performance of the harness group 40 against heat. Further, the high voltage circuit around the battery pack 5 is less likely to be exposed at a time of a vehicle collision. This can improve the safety of rescue work and the occupant protection performance.

Furthermore, the layout of pulling out the harness group 40 from the end surface of the inverter 27 in the vehicle width direction can improve the workability required for maintenance of the engine compartment, as compared with a layout of pulling out the harness group 40 from the back side (the vehicle rear side) of the inverter 27. Specifically, when a worker looks into the engine compartment from the front of the vehicle 1, the harness group 40 is routed at a position (front) close to the worker. As a result, for example, when the worker removes the harness group 40 from the inverter 27, he/she need not extend the hand to the back, and can easily work. Further, the worker can directly visually confirm the connection point between the harness group 40 and the inverter, and accurately understand a state of the harness group 40 and the inverter 27.

Further, the first harness 41 and the second harness 42 extend so that the center in the up-down direction bends backward. This can prevent tensile force applied to the first harness 41 and the second harness 42 if the vehicle 1 collides with the obstacle 100 in the front and the inverter 27 moves upward away from the engine 21 and the transaxle 23.

The third harness 43 and the fourth harness 44 are harnesses in which a direct current flows. Therefore, it is necessary to convert the alternating current generated by the generator 31 and the motor 33 into direct current and then supply the direct current to the third harness 43 and the fourth harness 44. Therefore, the DC circuit 53 is disposed on the rear side of the DC terminal block 57 in the inverter 27 to form a step portion 51. This can totally reduce the size of the inverter 27, the respective harnesses and so on, and prevent deformation and damage of the third harness 43 at a time of a vehicle collision, thereby improving vehicle protection performance.

The fourth harness 44 extends from the front with respect to the one end 43a of the third harness 43 in the DC terminal block 57 of the inverter 27, to the right. In other words, one end 44a of the fourth harness 44 is located between one end 42a of the second harness 42 and one end 43a of the third harness 43. Therefore, the front and rear of the one end 44a of the fourth harness 44, which is a thinner wiring than the second harness 42 and the third harness 43, are disposed so as to be sandwiched between the one end 42a of the second harness 42 and the one end 43a of the third harness 43. This allows preventing the fourth harness 44 from deteriorating due to, for example, so-called chipping of pebbles and so on that the drive wheels kick up when the vehicle 1 travels.

Further, the fourth harness 44 extends between: the first harness 41 and the second harness 42; and the inverter 27. This can prevent the fourth harness 44 from being pulled by the swing of the first harness 41 and the second harness 42 if the engine 21 and the transaxle 23 move in the front-rear direction relatively to the inverter 27 as described above.

In addition, the inverter 27 is disposed in a forward tilting posture in which the front side tilts downward by an angle θ, and the rear lower end P is located above the center C of the electric booster 29. Therefore, when the vehicle 1 collides with the obstacle 10G in the front, the rear lower end P of the inverter 27 can move upward as the inverter 27 moves backward. In addition, the rear lower end P is located above the center C of the electric booster 29. Therefore, this positional relationship can reduce the damage to each other due to contact of the inverter 27 with the electric booster 29 if the rear lower end P moves upward causing a contact of the inverter 27 with the electric booster 29.

Further, the first terminal block 61 of the generator 31 and the second terminal block 62 of the motor 33 are located in the predetermined space A formed because the motor 33 is located on the rear and upper sides of the generator 31. As a result, if the vehicle 1 collides with the obstacle 100 in the front, the first terminal block 61 and the second terminal block 62 can be prevented from the damage due to the collision of the inverter 27 and the like with the first terminal block 61 and the second terminal block 62. In addition, locating the radiator 21c in front of the drive unit 7 causes the radiator 21c to cover the front of the predetermined space A when the vehicle 1 collides with the obstacle 100 in the front. This can prevent damage to the first terminal block 61 and the second terminal block 62, and the other end 41b of the first harness 41 and the other end 42b of the second harness 42, due to scattered objects or the like.

Then, the lower end 21e of the radiator 21c is fixed to, that is, supported by the front end of the suspension cross member 17. This can reduce the movement of the radiator 21c to the rear and prevent the radiator 21c from coming into contact with the transaxle 23 when the vehicle 1 collides with the obstacle 100 in the front. Therefore if the radiator 21c and the transaxle 23 come into contact with each other the impact applied to the transaxle 23 can be reduced.

As described above the drive unit 7 of the vehicle 1 according to the present invention includes: an engine 21 disposed in an engine compartment 10 of the vehicle 1; an transaxle 23 disposed on one side of the engine 21 in a vehicle left-right direction the transaxle 23 having a generator 31 that generates electricity by driving the engine 21 and a motor 33 that is driven by electric power supplied from a battery pack 5 of the vehicle 1; an inverter 27 disposed above the transaxle 23; a first harness 41 that electrically connects the inverter 27 and the first terminal block 61 of the generator 31; and a second harness 42 that electrically connects the inverter 27 and the second terminal block 62 of the motor 33.

Further, the generator 31 and the motor 33 are disposed in a vehicle 1 front-rear direction and the motor 33 is offset upward in the up-down direction with respect to the generator 31 the generator 31 being one electric motor disposed on the front side in the front-rear direction out of the generator 31 and the motor 33 the motor 33 being the other electric motor disposed on the rear side in the front-rear direction out of the generator 31 and the motor 33, the transaxle 23 has a predetermined space A formed in a region above the generator 31 and in rear of a front end of the generator 31 and a region in front of the motor 33 and below an upper end of the motor 33, and the first terminal block 61 and the second terminal block 62 are located in the predetermined space A.

Thus the motor 33 is located on the rear side in the vehicle 1 front-rear direction and the upper side in the up-down direction with respect to the generator 31. This positional relationship forms the predetermined space A in a region above the generator 31 and in rear of the front end of the generator 31, and in a region in front of the motor 33 and below the upper end of the motor 33. Further, the first terminal block 61 and the second terminal block 62 are located in the predetermined space A. This allows the first terminal block 61 and the second terminal block 62 to be provided inside the outer edge of the transaxle 23 as viewed from the left-right direction of the vehicle 1.

The first harness 41 and the second harness 42 are formed so as to bend backward in the vehicle front-rear direction. This can further reduce the tensile force applied to the first harness 41 and the second harness 42 when the transaxle 23 and the inverter 27 move relatively.

The vehicle drive unit further includes a speed reducer 24 disposed between the engine 21 and the transaxle 23, wherein the first harness 41 extends downward from the inverter 27 while extending toward the engine 21 side in the vehicle left-right direction and is connected to the first terminal block 61 of the generator 31, the second harness 42 extends downward from the inverter 27 while extending toward the engine 21 side in the vehicle left-right direction and is connected to the second terminal block 62 of the motor 33, and the first harness 41 and the second harness 42 are located on the transaxle 23 side in the vehicle left-right direction with respect to a joint surface 23a between the speed reducer 24 and the engine 21.

Thus, the first harness 41 and the second harness 42 are placed within the transaxle 23 side with respect to the joint surface 23a between the speed reducer 24 and the engine 21 in the vehicle left-right direction. This can reduce the swing range of the first harness 41 and the second harness 42 in the vehicle 1 left-right direction.

The vehicle drive unit further includes: a braking device 3a that brakes the vehicle 1; and an electric booster 29 that adds force required to operate the braking device 3a. Here, the electric booster 29 is located on the rear side in the vehicle front-rear direction and the upper side in the up-down direction of the transaxle 23; and the inverter 27 is tilted forward so that a lower part in the up-down direction of the rear end in the vehicle front-rear direction is located on an upper side in the up-down direction and a front side in the front-rear direction with respect to a center of the electric booster 29 in the vehicle up-down direction. This can prevent the inverter 27 and the electric booster 29 from coming into contact with each other when the vehicle 1 collides in the front. This can also reduce the impact applied to the electric booster 29 if the inverter 27 and the electric booster 29 come into contact with each other.

Further, the drive unit includes a radiator 21c located in front of the transaxle 23. The radiator 21c is designed to cover the front of the predetermined space A when the radiator 21c moves backward due to, for example, a front collision of the vehicle 1. This can protect the first terminal block 61 and the second terminal block 62 located in the predetermined space A from scattered objects and the like.

In particular, the radiator 21c has the upper end 21d located in front of the inverter 27, and the lower end 21e fixed to the front end of a pair of left and right suspension cross members 17. Therefore, for example, when the radiator 21c moves backward due to a front collision of the vehicle 1, the upper end 21d of the radiator 21c is supported by the inverter 27, and the lower end 21e is supported by the pair of left and right suspension cross members 17. This can satisfactorily prevent the radiator 21c from entering the predetermined space A.

In addition, the motor 33 is disposed on the rear side in the front-rear direction of the generator 31 and is offset upward in the up-down direction with respect to the generator 31. Further, the first harness 41 and the second harness 42 bend backward in the vehicle front-rear direction. The first harness 41 extends rearward from the first terminal block 61 of the generator 31, and the second harness 42 extends forward from the second terminal block 62 of the motor 33. This positional relationship can prevent the first harness 41 from being pinched by peripheral parts when the vehicle 1 collides in the front. The second harness 42 extends from the second terminal block 62 of the motor 33 located behind the generator 31, in other words, from the second terminal block 62 located on the rear side in the predetermined space A, and extends forward. This can make the harness wiring compact in the front-rear direction in the predetermined space A.

This concludes the description of the vehicle drive unit according to the present invention, but the present invention is not limited to the above embodiment and can be changed without departing from the gist of the present invention.

For example, in the present embodiment, the motor 33 is located on the rear side and the upper side of the generator 31. However, the positions of the generator 31 and the motor 33 may be reversed, in other words, the generator 31 may be located on the rear side and the upper side of the motor 33.

Further, in the present embodiment, the speed reducer 24 is used, but a transmission capable of adjusting the degree of deceleration may be used.

Further, in the present embodiment, the first harness 41 and the second harness 42 are bent backward in the front-rear direction of the vehicle but they may be bent forward, which may be changed as appropriate from the positional relationship of respective devices or the like.

Further, the above-described embodiment illustrates the structure in which the condenser tank 73 is arranged in rear of the inverter 27. However, instead of the condenser tank 73, a reservoir tank (a tank for absorbing the volume change of the EV cooling water) may be arranged, or a washer tank (a tank in which the window washer fluid is stored) may be arranged. Arranging at least a container for storing a liquid in rear of the inverter 27 exhibits the same effect as that of the above-described embodiment.

A vehicle drive unit according to a first aspect of the present invention includes: an internal combustion engine disposed in an engine compartment of a vehicle; an electromotive unit disposed on one side of the internal combustion engine in a vehicle left-right direction, the electromotive unit having a first electric motor that generates electricity by driving the internal combustion engine and a second electric motor that is driven by electric power supplied from a driving battery of the vehicle; an inverter disposed above the electromotive unit; a first harness that electrically connects the inverter and a first terminal block of the first electric motor; and a second harness that electrically connects the inverter and a second terminal block of the second electric motor, wherein the first electric motor and the second electric motor are disposed in a vehicle front-rear direction, and, with respect to one electric motor, another electric motor is offset upward in the up-down direction, the one electric motor being disposed on the front side in the front-rear direction out of the first electric motor and the second electric motor, the other electric motor being disposed on the rear side in the front-rear direction out of the first electric motor and the second electric motor, the electromotive unit has a predetermined space formed in a region above the one electric motor and in rear of a front end of the one electric motor and a region in front of the other electric motor and below an upper end of the other electric motor, and the first terminal block and the second terminal block are located in the predetermined space.

In the first aspect of the present invention, the electromotive unit has a predetermined space formed in the region above one electric motor and in rear of the front, end of the one motor and in the region in front of the other electric motor and below the upper end of the other motor. Further, the first terminal block and the second terminal block is located in the predetermined space. This positional relationship allows the first terminal block and the second terminal block to be provided inside the outer edge of the electromotive unit as viewed from the vehicle left-right direction.

In the vehicle drive unit according to the second aspect of the present invention, the first harness and the second harness can bend forward or backward in the front-rear direction of the vehicle.

In the second aspect of the present invention, the first harness and the second harness bend forward or backward, so that the tensile force applied to the first harness and the second harness can be further reduced when the electromotive unit and the inverter move relatively.

The vehicle drive unit according to a third aspect of the present invention may further include a transmission disposed between the internal combustion engine and the electromotive unit, wherein the first harness extends downward from the inverter toward the internal combustion engine side in the vehicle left-right direction and is connected to the first terminal block of the first electric motor, the second harness extends downward from the inverter toward the internal combustion engine side in the vehicle left-right direction and is connected to the second terminal block of the second electric motor, and the first harness and the second harness are located on the electromotive unit side in the vehicle left-right direction with respect to a joint portion between the transmission and the internal combustion engine.

In the third aspect of the present invention, the first harness and the second harness are placed within the electromotive unit side with respect to the joint portion between the transmission and the internal combustion engine as viewed in the vehicle left-right direction. This can reduce the swing range of the first harness and the second harness in the vehicle left-right direction.

A vehicle drive unit according to a fourth aspect of the present invention may include: a braking device that brakes the vehicle; and a braking force adding device that adds force required to operate the braking device, wherein the braking force adding device is located on the rear side of the electromotive unit in the vehicle front-rear direction and the upper side in the up-down direction, and the inverter is tilted forward so that a lower part in the up-down direction of the rear end in the vehicle front-rear direction is located on an upper side in the up-down direction and a front side in the front-rear direction with respect to a center of the braking force adding device in the vehicle up-down direction.

In the fourth aspect of the present invention, the inverter tilts forward so that the lower part of the rear end of the inverter is located on the upper side and the front side with respect to the center of the braking force adding device in the up-down direction. This can prevent the contact between the inverter and the braking force adding device when the vehicle collides in the front. This can also reduce the impact applied to the braking force adding device if the inverter and the braking force adding device come into contact with each other.

The vehicle drive unit according to a fifth aspect of the present invention may further include a radiator located in front of the electromotive unit, wherein the radiator covers the front of the predetermined space when the radiator moves backward.

In the fifth aspect of the present invention, for example, when the radiator moves backward due to the front collision of the vehicle, the radiator covers the front of the predetermined space. This can protect the first terminal block and the second terminal block located in the predetermined space from scattered objects and the like.

The vehicle drive unit according to a sixth aspect of the present invention may be configured such that the radiator has an upper end located in front of the inverter and a lower end fixed to front ends of a pair of left and right suspension cross members.

In the sixth aspect of the present invention, the upper end of the radiator is located in front of the inverter, and the lower end thereof is fixed to the front ends of the pair of left and right suspension cross members. Therefore, for example, when the radiator moves backward due to a front collision of the vehicle, the upper end of the radiator is supported by the inverter and the lower end thereof is supported by the pair of left and right suspension cross members. This can satisfactorily prevent the radiator from entering a predetermined space.

The vehicle drive unit according to a seventh aspect of the present invention may be configured such that the second electric motor is disposed on the rear side in the front-rear direction with respect to the first electric motor, and is also offset upward in the up-down direction with respect to the first electric motor, the first harness and the second harness bend backward in the vehicle front-rear direction, the first harness extends backward from the first terminal block of the first electric motor, and the second harness extends forward from the second terminal block of the second electric motor.

In the seventh aspect of the present invention, the first harness, which extends from the first terminal block of the first electric motor located on the front side of the second motor, in other words, from the first terminal block located on the front side in the predetermined space, extends rearward. This can prevent the first harness from being pinched by peripheral parts, for example, when the vehicle collides in the front. In addition, the second harness, which extends from the second terminal block of the second electric motor located on the rear side of the first electric motor, in other words, from the second terminal block located on the rear side in the predetermined space, extends forward. This can make the harness wiring compact in the front-rear direction in the predetermined space.

The vehicle drive unit according to an eighth aspect of the present invention may further include a refrigerant pipe connected to each of a front end part and a rear end part of the inverter, the refrigerant pipe being a pipe through which a refrigerant for cooling the inverter flows.

In the eighth aspect of the present invention, a refrigerant pipe through which a refrigerant for cooling the inverter flows is connected to each of the front end part and the rear end part of the inverter. This can prevent the refrigerant pipe from interfering with the first harness and the second harness.

The vehicle drive unit according to a ninth aspect of the present invention may include a container, arranged on the vehicle rear side with respect to the inverter, for storing a liquid, the container being in line with the inverter in the vehicle longitudinal direction.

In the ninth aspect of the present invention, the container for storing a liquid is arranged on the rear of the inverter 27. This can make the container act like a cushion and prevent the inverter from being damaged.

EXPLANATION OF REFERENCE SIGNS 1 vehicle
3a braking device
5 battery pack (driving battery)
9 air conditioner
10 engine compartment
17 suspension cross member
21 engine (internal combustion engine)
21c radiator
21d upper end
21e lower end
23 transaxle (electromotive unit)
23a joint surface (joint portion)
24 speed reducer (transmission)
27 inverter
29 electric booster (braking force adding device)
31 generator (first electric motor)
33 motor (second electric motor)
41 first harness
42 second harness
61 first terminal block
62 second terminal block
64 electric air compressor
71 refrigerant pipe
73 condenser tank (container)
A predetermined space

The invention claimed is:
1. A vehicle drive unit, comprising:
an internal combustion engine disposed in an engine compartment of a vehicle;
an electromotive unit disposed on one side of the internal combustion engine in a vehicle left-right direction, the electromotive unit having a first electric motor that generates electricity by driving the internal combustion engine and a second electric motor that is driven by electric power supplied from a driving battery of the vehicle;
an inverter disposed above the electromotive unit;
a first harness that electrically connects the inverter and a first terminal block of the first electric motor; and
a second harness that electrically connects the inverter and a second terminal block of the second electric motor,
wherein the first electric motor and the second electric motor are disposed in a vehicle front- rear direction, and, with respect to one electric motor, another electric motor is offset upward in the up-down direction, the one electric motor being disposed on the front side in the front-rear direction out of the first electric motor and the second electric motor, the other electric motor being disposed on the rear side in the front-rear direction out of the first electric motor and the second electric motor, the electromotive unit has a predetermined space formed in a region above the one electric motor and in rear of a front end of the one electric motor and a region in front of the other electric motor and below an upper end of the other electric motor, and the first terminal block and the second terminal block are located in the predetermined space.

2. The vehicle drive unit according to claim 1, wherein the first harness and the second harness bend forward or backward in the vehicle front-rear direction.

3. The vehicle drive unit according to claim 1, further comprising a transmission disposed between the internal combustion engine and the electromotive unit, wherein the first harness extends downward from the inverter toward the internal combustion engine side in the vehicle left-right direction, and is connected to the first terminal block of the first electric motor, the second harness extends downward from the inverter toward the internal combustion engine side in the vehicle left-right direction, and is connected to the second terminal block of the second electric motor, and the first harness and the second harness are located on the electromotive unit side in the vehicle left-right direction with respect to a joint portion between the transmission and the internal combustion engine.

4. The vehicle drive unit according to claim 1, further comprising:

a braking device that brakes the vehicle; and a braking force adding device that adds force required to operate the braking device, wherein the braking force adding device is located on the rear side of the electromotive unit in the vehicle front-rear direction and the upper side in the up-down direction, and the inverter is tilted forward so that a lower part in the up-down direction of the rear end in the vehicle front-rear direction is located on an upper side in the up-down direction and a front side in the front-rear direction with respect to a center of the braking force adding device in the vehicle up-down direction.

5. The vehicle drive unit according to claim 1, further comprising a radiator located in front of the electromotive unit, wherein the radiator covers the front of the predetermined space when the radiator moves backward.

6. The vehicle drive unit according to claim 5, wherein the radiator has an upper end located in front of the inverter and a lower end fixed to front ends of a pair of left and right suspension cross members.

7. The vehicle drive unit according to claim 1, wherein the second electric motor is disposed on the rear side in the front-rear direction with respect to the first electric motor, and is also offset upward in the up-down direction with respect to the first electric motor, the first harness and the second harness bend backward in the vehicle front-rear direction, the first harness extends backward from the first terminal block of the first electric motor, and the second harness extends forward from the second terminal block of the second electric motor.

8. The vehicle drive unit according to claim 1, further comprising a refrigerant pipe connected to each of a front end part and a rear end part of the inverter, the refrigerant pipe being a pipe through which a refrigerant for cooling the inverter flows.

9. The vehicle drive unit according to claim 1, further comprising a container, arranged on the vehicle rear side with respect to the inverter, for storing a liquid, the container being in line with the inverter in the vehicle longitudinal direction.

* * * * *